(12) United States Patent
Chanclon Fernandez et al.

(10) Patent No.: US 10,160,159 B2
(45) Date of Patent: Dec. 25, 2018

(54) BUILD MATERIAL CONTAINER

(71) Applicant: Hewlett-Packard Development Company, L.P., Houston, TX (US)

(72) Inventors: Ismael Chanclon Fernandez, Barcelona (ES); Xavier Alonso Becerro, Sant Cugat del Valles (ES); Marc Morros, Sant Cugat del Valles (ES); Nicola Cofelice, Sant Cugat del Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/736,738

(22) PCT Filed: May 12, 2016

(86) PCT No.: PCT/EP2016/060763
§ 371 (c)(1),
(2) Date: Dec. 14, 2017

(87) PCT Pub. No.: WO2017/194139
PCT Pub. Date: Nov. 16, 2017

(65) Prior Publication Data
US 2018/0169945 A1    Jun. 21, 2018

(51) Int. Cl.
*B29C 39/12* (2006.01)
*B01F 13/02* (2006.01)
(Continued)

(52) U.S. Cl.
CPC ........ *B29C 64/255* (2017.08); *B01D 46/0004* (2013.01); *B01D 46/10* (2013.01); *B22F 3/004* (2013.01); *B22F 3/008* (2013.01); *B28B 1/001* (2013.01); *B29C 31/02* (2013.01); *B29C 64/153* (2017.08); *B29C 64/165* (2017.08);
(Continued)

(58) Field of Classification Search
CPC ......... B29C 39/12; B01F 13/02; B01D 46/00; B29B 7/24; B41J 2/165; B65D 83/06; G03G 21/10
USPC ................. 55/385.1; 425/200, 447; 366/102; 137/571; 347/32; 222/630
See application file for complete search history.

(56) References Cited

U.S. PATENT DOCUMENTS

2001/0015238 A1    8/2001    Gaylo et al.
2006/0074394 A1    4/2006    Beretta et al.
(Continued)

FOREIGN PATENT DOCUMENTS

WO    WO-2007139938 A2    12/2007

OTHER PUBLICATIONS

The Recycler, "3D Printer Filling Kit Released", May 28, 2015, pp. 6. http://www.therecycler.com/posts/3d-printer-filling-kit-released.
(Continued)

*Primary Examiner* — Duane Smith
*Assistant Examiner* — Minh Chau T Pham
(74) *Attorney, Agent, or Firm* — HPI Patent Department (57) ABSTRACT

A build material container for use in 3D printing includes a reservoir to hold build material and a build material outlet structure. The container also includes a throughput structure to allow air to enter into the reservoir through the throughput opening, wherein said throughput opening provides access to build material in and out of the reservoir.

18 Claims, 4 Drawing Sheets

(51) Int. Cl.
    *B01D 46/00* (2006.01)
    *B29B 7/24* (2006.01)
    *B41J 2/165* (2006.01)
    *B65D 83/06* (2006.01)
    *G03G 21/10* (2006.01)
    *B29C 64/255* (2017.01)
    *B29C 31/02* (2006.01)
    *B33Y 40/00* (2015.01)
    *B29C 64/153* (2017.01)
    *B29C 64/165* (2017.01)
    *B29C 64/20* (2017.01)
    *B29C 64/321* (2017.01)
    *B29C 64/371* (2017.01)
    *B01D 46/10* (2006.01)
    *B28B 1/00* (2006.01)
    *B22F 3/00* (2006.01)
    *B33Y 30/00* (2015.01)
    *B22F 3/105* (2006.01)
    *B33Y 70/00* (2015.01)
    *B65D 51/16* (2006.01)
    *B22F 1/00* (2006.01)

(52) U.S. Cl.
    CPC ............ *B29C 64/20* (2017.08); *B29C 64/321* (2017.08); *B29C 64/371* (2017.08); *B33Y 30/00* (2014.12); *B33Y 40/00* (2014.12); *B01D 2275/30* (2013.01); *B01D 2277/30* (2013.01); *B01D 2279/35* (2013.01); *B22F 1/0059* (2013.01); *B22F 1/0074* (2013.01); *B22F 3/1055* (2013.01); *B22F 2001/0092* (2013.01); *B22F 2003/1056* (2013.01); *B33Y 70/00* (2014.12); *B65D 51/1616* (2013.01)

(56) References Cited

U.S. PATENT DOCUMENTS

| | | | |
|---|---|---|---|
| 2008/0006334 A1* | 1/2008 | Davidson | B33Y 30/00 137/571 |
| 2010/0192806 A1 | 8/2010 | Heugel et al. | |
| 2011/0083768 A1 | 4/2011 | Sims et al. | |
| 2011/0223349 A1 | 9/2011 | Scott | |
| 2011/0233808 A1 | 9/2011 | Davidson | |
| 2012/0107438 A1* | 5/2012 | Bokodi | B01F 7/00125 425/200 |

OTHER PUBLICATIONS

International Search Report and Written Opinion dated Jan. 19, 2017, PCT Patent Application No. PCT/EP2016/060763, filed May 12, 2016, European Patent Office.

* cited by examiner

BUILD MATERIAL CONTAINER

CLAIM FOR PRIORITY

The present application is a national stage filing under 35 U.S.C. § 371 of PCT application number PCT/EP2016/060763, having an international filing date of May 12, 2016, the disclosure of which is hereby incorporated by reference in its entirety.

BACKGROUND

Additive manufacturing techniques such as three-dimensional (3D) printing, relate to techniques for making 3D objects of almost any shape from a digital 3D model through additive processes, in which 3D objects are generated on a layer-by-layer basis under computer control. A large variety of additive manufacturing technologies have been developed, differing in build materials, deposition techniques and processes by which the 3D object is formed from the build material. Such techniques may range from applying ultraviolet light to photopolymer resin, to melting semi-crystalline thermoplastic materials in powder form, to electron-beam melting of metal powders.

Additive manufacturing processes usually begin with a digital representation of a 3D object to be manufactured. This digital representation is virtually sliced into layers by computer software or may be provided in pre-sliced format. Each layer represents a cross-section of the desired object, and is sent to an additive manufacturing apparatus, that in some instances is known as a 3D printer, where it is built upon a previously built layer. This process is repeated until the object is completed, thereby building the object layer-by-layer. While some available technologies directly print material, others use a recoating process to form additional layers that can then be selectively solidified in order to create the new cross-section of the object.

The build material from which the object is manufactured may vary depending on the manufacturing technique and may comprise powder material, paste material, slurry material or liquid material. The build material is usually provided in a source container from where the build material needs to be transferred to the building area or building compartment of the additive manufacturing apparatus where the actual manufacturing takes place. WO 2007/139938 A2 (CORP Z [US]: DAVIDSON THOMAS [US]; HERNANDES ANDRES T [US]; KINSLEY J O) describes means of transporting powder from multiple sources to a powder dispensing apparatus. US 2011/083768 A1 (SIMS DAVID M [US] ET AL) relates to shipping and off-loading of a granular, powdered, or other particulate materials using flexible containers.

DRAWINGS

For simplicity and clarity of illustration, the same reference numerals will be used throughout the figures to refer to the same or like parts, unless indicated otherwise.

The components in the figures are not necessarily to scale, emphasis instead being placed upon illustrating the principles of the invention.

DESCRIPTION

Three-dimensional objects can be generated using additive manufacturing techniques. The objects may be generated by solidifying portions of successive layers of build material. The build material can be powder-based and the material properties of generated objects may be dependent on the type of build material and the type of solidification. In some examples, solidification of the powder material is enabled using a liquid fusing agent. Solidification may be further enabled by temporary application of energy to the build material. In certain examples, fuse and/or bind agents are applied to build material, wherein a fuse agent is a material that, when a suitable amount of energy is applied to a combination of build material and fuse agent, causes the build material to fuse and solidify. In other examples, other build materials and other methods of solidification may be used. In certain examples, the build material includes paste material, slurry material or liquid material. This disclosure describes examples of build material containers for adding build material to the additive manufacturing process.

In one example the build material in the container of this disclosure is powder that has an average volume-based cross sectional particle diameter size of between approximately 5 and approximately 400 microns, between approximately 10 and approximately 200 microns approximately, between approximately 15 and approximately 120 microns or between approximately 20 and approximately 70 microns. Other examples of suitable, average volume-based particle diameter ranges include approximately 5 to approximately 70, or approximately 5 to approximately 35 microns. In a particular example, the powder has an average volume-based particle diameter of less than 120 microns. In this disclosure a volume-based particle size is the size of a sphere that has the same volume as the powder particle. With "average" it is intended to explain that most of the volume-based particle sizes in the container are of the mentioned size or size range but that the container may also contain relatively small amounts (e.g., less than 5%, or less than 2%, or less than 1%, or less than 0,1%) of particles of diameters outside of the mentioned range. For example, the particle sizes may be chosen to facilitate distributing build material layers having thicknesses of between approximately 10 and approximately 500 microns, or between approximately 10 and approximately 200 microns, or between approximately 15 and approximately 150 microns. One example of an additive manufacturing apparatus may be pre-set to distribute build material layers of approximately 80 microns using build material containers that contain powder having average volume-based particle diameters of between approximately 40 and approximately 60 micron. For example the additive manufacturing apparatus can be reset to distribute different layer thicknesses.

Suitable powder-based build materials for additive manufacturing include polymers, crystalline plastics, semi-crystalline plastics, polyethylene (PE), polylactic acid (PLA), acrylonitrile butadiene styrene (ABS), amorphous plastics, Polyvinyl Alcohol Plastic (PVA), Polyamide, thermo(setting) plastics, resins, transparent powders, colored powders, metal powder, ceramics powder such as for example glass particles, and/or a combination of at least two of these or other materials wherein such combination may include different particles each of different materials or different materials in a single compound particle. Examples of blended build materials include alumide, which may include a blend of aluminum and polyamide, multi-color powder, and plastics/ceramics blends. There exist more build materials and blends of build materials that can be contained by a container of this disclosure and that are not mentioned in this disclosure.

A particular batch of build material used in an additive manufacturing process may be "virgin" build material or "used" build material. Virgin build material should be considered to be build material which has not been used in any part of an additive manufacturing process, and/or has not passed through any part of a 3D printing system. An unopened supply of build material as supplied by a build material manufacturer therefore may contain virgin build material. By contrast, used build material has already been supplied to a 3D printing system for use in an additive manufacturing process. Not all of the build material supplied to a 3D printing system for use in an additive manufacturing process may be incorporated into a 3D printed article. At least some of the build material supplied to a 3D printing system for use in an additive manufacturing process may be suitable for reuse in a subsequent additive manufacturing process. Such build material comprises used build material.

In one example, fusing agent is dispensed onto build material by a printhead of a 3D printer. A 3D printer is one type of an additive manufacturing apparatus. In this particular disclosure an additive manufacturing apparatus may also be a build material recycler that is not necessarily a part of the 3D printer. An example of an additive manufacturing component is a build material stage for additive manufacturing that is used to distribute build material onto, to receive the fuse agent and support the object during additive manufacturing. The build material stage can be a separately moveable component to be connected to an additive manufacturing apparatus such as the 3D printer or recycler. The additive manufacturing apparatus or component may include a build material collection system to collect build material from a build material container. The build material collection system may also be a separate sub-system, separate from any additive manufacturing apparatus.

The build material container may be a source container from which build material is added to the additive manufacturing process. The source container can contain fresh or used (recycled) build material.

In use, build material contained in a build material container may be supplied to an additive manufacturing apparatus by aspiration through an outlet opening of the container. The build material, such as powder, is entrained out of the container by the air flow traveling through the outlet opening. In examples of the present disclosure, a 3D printing build material container and additive manufacturing process are discussed that aim to improve the transport of build material out of the container.

Further, one may need to fill a build material container with build material or empty it while aspiration through the outlet opening is in progress. However, as the outlet opening of the container is coupled to a collection system (e.g., an aspiration hose) during use, access to build material in or out of the container is prevented. A user must wait for the aspiration to be ended before disconnecting the outlet opening from the collection system. Once the outlet opening is free from the collection system, the use may empty the container or fill it with extra build material. Additional manipulations are then required to reconnect the outlet opening of the container to the collection system before starting again aspiration of the build material for collection by the collection system. In examples of the present disclosure, a 3D printing build material container and additive manufacturing process are discussed that aim to improve the way build material may be filled in or poured out of a container before, during or after build material collection through the outlet opening by a collection system.

Figure 1:
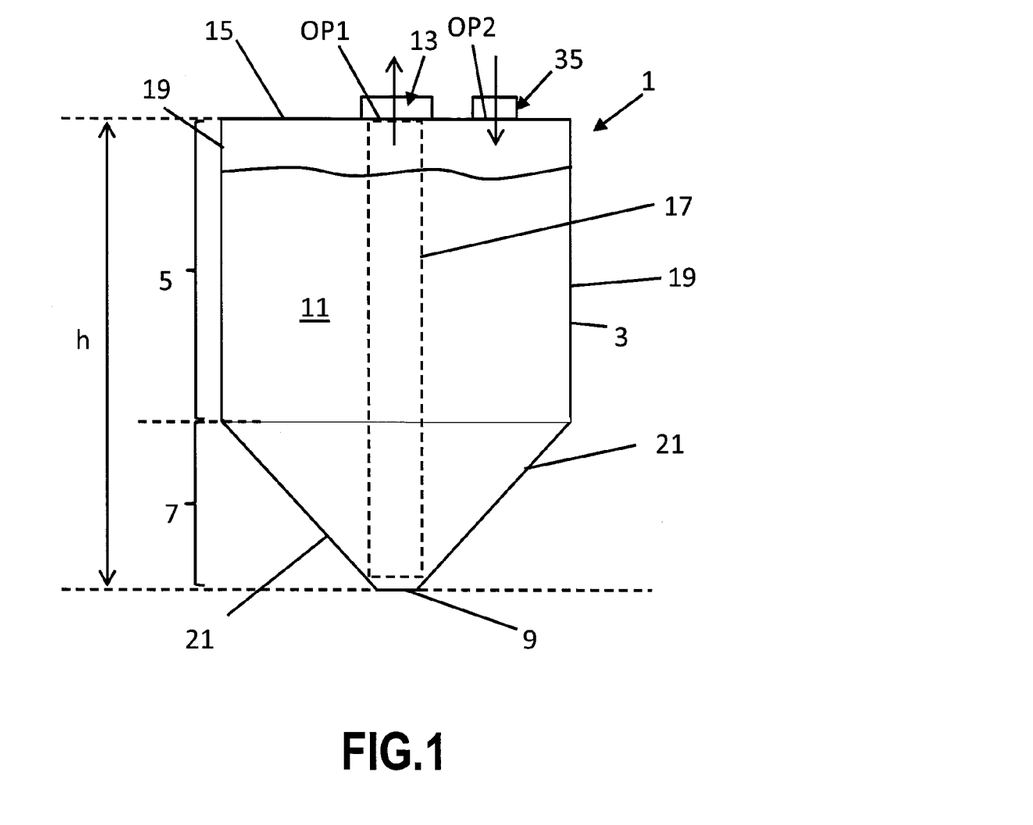
FIG. 1 illustrates a diagram of an example of a container of build material.
Figure 7:
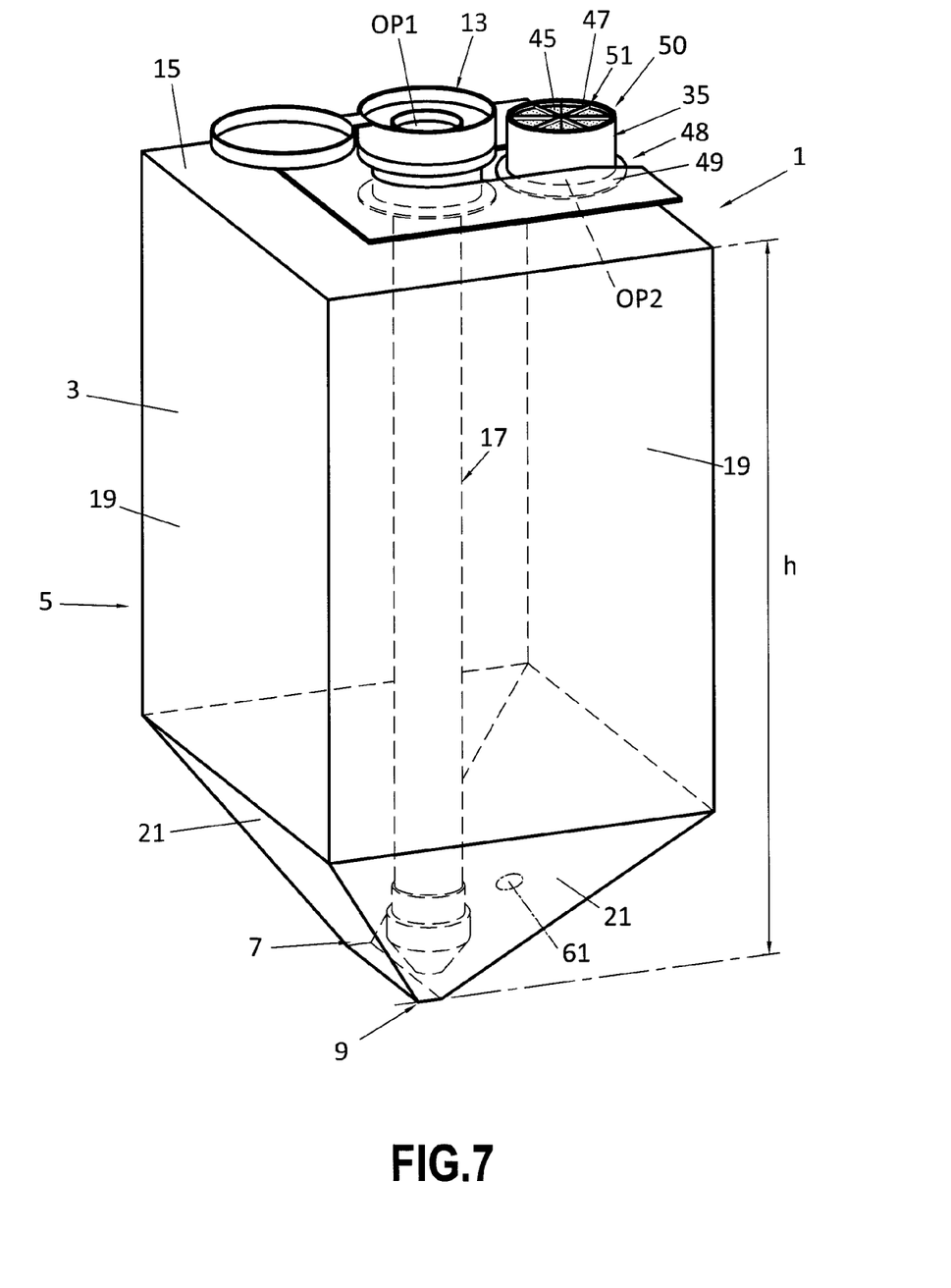
FIG. 7 illustrates a diagram of an example of a build material container.

FIG. 1 illustrates a diagrammatic front view of an example of an additive manufacturing build material container 1 for supplying build material 11 to an additive manufacturing process. FIG. 7 illustrates the build material container 1 according to a particular example.

In one example, the build material container 1 is a replaceable source container that is to be connected to a collection system of an additive manufacturing apparatus or a separate build material collection system. Thereby, the collection system can collect most or all of the build material from the container 1 and provide it to a respective additive manufacturing apparatus. The build material container 1 can be disconnected from the additive manufacturing apparatus after exhaustion, to be replaced by another, similar container with build material.

Some example containers of this disclosure may be to facilitate efficient removal of build material contained within those containers. Some such example containers may, e.g., comprise features to ensure that most or all of the build material can be removed from a container. Some such example containers may comprise features to ensure that the containers can be easily stacked, stored, transported, disposed or refilled. In a filled condition, the container should contain a relatively large volume of build material.

The build material container 1 is illustrated in an upright orientation. In one example the build material is powder, for example of a type and/or particle size as described above. The container 1 includes a reservoir 3 for holding the build material 11. The build material is contained by walls of the reservoir 3.

The container 1 further includes an outlet structure 13 including an outlet opening OP1 to allow build material 11 to pass out of the reservoir 3, or where needed, into the reservoir 3. In the example illustrated in FIG. 1, the outlet structure 13 is provided in or near a top side 15 of the container 1, although other arrangements are possible. The outlet structure 13 is adapted to cooperate with a corresponding collection system that is to collect build material from the container 1. The outlet structure 13 may be suitable to (or include an adaptor to) connect to an external pressure unit (e.g., as a vacuum source) of the collection system to facilitate retrieving build material 11 from the reservoir 3 by vacuum suction. In a first usage of the container 1, the container 1 may contain virgin build material.

As shown in FIG. 1 and FIG. 7, the container 1 also includes a throughput structure 35, distinct from the outlet structure 13. The throughput structure 35 includes a throughput opening OP2 to allow air to enter into the reservoir 3 through said throughput opening OP2. Thereby the throughput opening OP2 may function as a vent to vent ambient air. The throughput opening OP2 also provides access to build material 11 in and out of said reservoir 3. As will be discussed further below, the throughput structure 35 may be used for venting of the inside of the reservoir 3 as well as for emptying and/or filling of the build material container 1 when needed. In the example depicted in FIG. 1, the throughput structure 35 that includes the throughput opening OP2 is provided in the top wall 15 of the container 1, although other arrangements are possible.

The throughput opening OP2 may have any appropriate shape and dimensions for providing access to build material 11 in and out of the reservoir 3. The throughput opening OP2 may be circular in shape. In a particular example, the diameter of the throughput opening OP2 is greater than 30 mm, for instance between approximatively 30 and 85 mm, or between approximatively 50 and 65 mm, to allow proper filling and emptying while facilitating air flow, for instance between 20 and 30 liters/second. The throughput opening diameter may however be adapted depending on the volume of the reservoir 3.

In the present example, as shown in FIG. 1 and FIG. 7, the reservoir 3 includes a funneled, lower portion 7 having at least one converging side wall 21, and an upper portion 5 of at least one non-converging side wall 19, above the funnel 7. In one example, the upper and lower portions 5, 7 are parts of a single, monolithic, reservoir. The non-converging side walls 19 may extend upwards from the funnel 7, for instance along most of the height h. The at least one non-converging side wall 19 of the upper portion 5 may extend substantially upright, i.e. vertically, in an upright, unfolded and filled condition of the container 1. In different examples, the at least one non-converging side wall 19 may be at least one rounded wall or four walls that form a rectangle with straight or rounded corners. In this example we will discuss the rectangular version having four non-converging side walls 19.

As shown in FIG. 1 and FIG. 7, the bottom portion of the reservoir 3 is a funnel 7 and includes at least one converging side wall 21. The funnel at the lower portion 7 is to guide the build material 11 towards a center collection area at a bottom 9 of the reservoir 3 (under influence of gravity and/or pressure generated by the pressure unit) from where the build material 11 can be readily collected for delivery to a respective additive manufacturing apparatus, thereby facilitating collection of most or all of the build material from the reservoir 3. The funnel 7 may have a truncated and/or rounded bottom 9 onto which the converging walls 21 terminate. In different examples, the funnel 7 may include one round side wall or may have a rectangular cross-section of four converging side walls 21 with pointy or rounded borders in between.

In a particular example, the converging walls 21 may at least partly flex in a partly empty or an operational condition of the reservoir 3; the walls 21 may include wrinkles, curvatures, ridges, undulated shapes, etc., before, during or after pressure has been applied to the inside of the reservoir 3.

The reservoir 3 may be made of at least partly flexible material. For example, the reservoir 3 can be folded in an empty condition, the walls may flex in a partly empty or an operational condition of the reservoir 3, the walls 19, 21 may include wrinkles, curvatures, ridges, undulated shapes, etc. For example, upright walls of the upper portion 5 have a default substantially upright orientation in an unfolded, filled condition of the container 1. In another example, the reservoir 3 may be relatively rigid, or partly relatively rigid and partly relatively flexible.

In one example, relatively flexible can be understood as allowing bending of the wall material, while a rigid material should be understood as resisting bending or stretching. A flexible material or compound can be elastic (e.g. PE or other polymer based materials) or non-elastic (e.g. Mylar or other materials including film layers that include a vapor barrier layer). In one example, a flexible and elastic wall material has a Young's modulus of less than approximately $1*10^9$ N/m² (or GPa), or less than approximately $0.3*10^9$ N/m² (or GPa). In one example a relatively rigid or non-elastic wall material has a Young's modulus of more than approximately $1*10^9$ N/m² (or GPa).

In case the reservoir 3 is made of at least partly flexible material, reinforcement structure may be provided to reinforce the at least partly flexible reservoir 3. Walls of the reinforcement structure are more rigid than walls of the flexible material. The reinforcement walls are to resist flexing or bending. The reinforcement structure may include walls that extend from a top up to a bottom of the container 1. The reinforcement structure may generally be of a single material. For example, the reservoir 3 is formed by an at least partly flexible bag such as plastics or multi-layer vapor barrier material, and the reinforcement structure includes foldable material such cardboard, metal or relatively rigid compounds.

In one example, the build material 11 is to be collected from the bottom 9 with the aid of a collection unit (or collect structure) 17, as shown in FIGS. 1 and 7. The collection unit 17 may collect build material 11 from the bottom of the reservoir 3 and guide the build material 11 to the outlet structure 13. Various embodiments of the collection unit 17 may be implemented in the present disclosure. The collection unit 17 may extend in the reservoir 3 from a top region to a bottom region of the reservoir 3. In the illustrated example, the collection unit 17 extends from the outlet opening OP1 of the outlet structure 13 to the bottom 9 of the reservoir 3. In one particular example, the collection unit 17 includes one or a plurality of openings (e.g., lateral openings) at the bottom end portion to facilitate collection of build material within the collection unit 17 so that it can be guided to the outlet structure 13. In one example, the collection unit 17 can be a tube to suck in build material 11 from the bottom 9 by applying a vacuum to the tube through an external pressure unit. The external pressure unit may generate a negative pressure to the reservoir 3 to suck up build material 11, or may be configured to generate a negative and positive pressure, depending on whether it is switched to a fill or suction mode. In another example, the collection unit 17 can include a screw or spiral-type transport mechanism for retrieving build material.

The collection unit 17 can be part of, or connectable to, an external build material collection system. In one example, the collection unit 17 is part of the outlet structure 13 of the container 1 whereby the build material 11 is collected from the bottom 9 with the aid of an external collection system that connects to the collection unit 17 through the outlet structure 13. For example, the collection unit 17 is a tube and the collection system includes a pressure unit, whereby build material is sucked into the collection unit 17 by the pressure unit.

In another example, the collection unit 17 is external to the container, to be inserted into the reservoir 3 to retrieve build material, through the outlet structure 13. Such external collection unit 17 may be inserted in the outlet structure 13 and in inserted condition may be able to reach the bottom 9.

In a particular example, the outlet structure 13 may include a guide structure to guide an aspiration structure of a collection system (e.g., a pressure unit) into connection for aspiration. In one example, the guide structure is part of an adaptor included in the outlet structure 13 to connect to the collection system. In a particular example, the collection unit 17 described above may function as a guide structure as it may guide a pressure snout into the outlet structure 13.

In particular examples, the build material reservoirs 3 are to hold build material volumes of for example approximately 5 to approximately 50 liters, approximately 10 to approximately 40 liters, for example approximately 30 liters. The weights associated with these volumes may depend on the build material, powder grain size, etc. Example containers 1 to hold these volumes may be of a height h of approximately 700 mm or less, approximately 650 millimeters or less, for example having a width of approximately 400 mm or less. These dimensions, and associated weights, may allow for readily handling the container 1 by an operator, for example to manually lift, stack and move the container 1. Also, the container 1 may be adapted to be folded, stacked and/or disposed of in an empty condition. In certain examples, the container 1 can have larger build material volumes such as for example more than said 50 liters, for example up to 100, 150 or 200 liters.

As indicated earlier, the container 3 of FIG. 1 includes a throughput structure 35 that facilitates venting. By venting the inside of the reservoir 3, the air flow traveling through the outlet opening OP1 during vacuum suction may be improved, thereby increasing the efficiency of supplying build material out of the reservoir 3 to a collection system. The throughput structure 35 may be provided next to the outlet structure 13. As shown in FIGS. 1 and 7, the throughput structure 35 may be positioned in or near the top wall 15 of the reservoir 3, although other arrangements are possible.

In addition to venting, the throughput structure 35 is adapted to allow an operator to (i) add build material to the reservoir 3, or (ii) pour build material out of the reservoir 3. Hence, the throughput structure 35 includes an opening OP2 over which the throughput structure 35 extends, to allow, in one mode, air, and in another mode, build material to pass. Having the throughput structure 35 in the top wall 15 may facilitate venting when the reservoir 3 is filled up to the top. The throughput structure 35 can be positioned between the outlet structure 13 and a lateral side wall 19 of the reservoir 3, for example at a distance from the outlet structure 13, relatively near the lateral side wall 19 of the reservoir 3. In a particular example, the throughput structure 35 is positioned on the top side 15 of the container 3, adjacent to a lateral side wall 19 of the reservoir 3. Positioning the throughput structure 35 near the side wall 9 facilitates pouring build material directly from the reservoir 3. In a particular example, the throughput structure 35 is positioned at approximately a mid-position between the outlet structure 13 and a lateral side wall 19.

Figure 2:
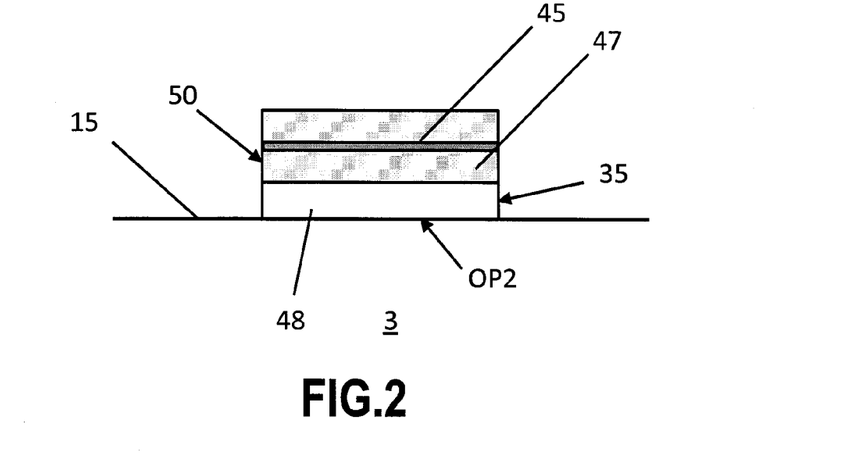
FIG. 2 illustrates a diagram of an example of a throughput structure of a container.

In a particular example illustrated in FIGS. 2 and 7, the throughput structure 35 of the container 1 includes a removable filter structure 50 which, when coupled to the container 1 (i.e., in a vent mode), covers the throughput opening OP2 so as to allow air to pass while retaining build material 11. In other words, when coupled to the reservoir 3 in a vent mode, the removable filter structure 50 inhibits access of build material 11 in and out of the reservoir 3 while allowing air to enter into said reservoir 3.

Figure 3:
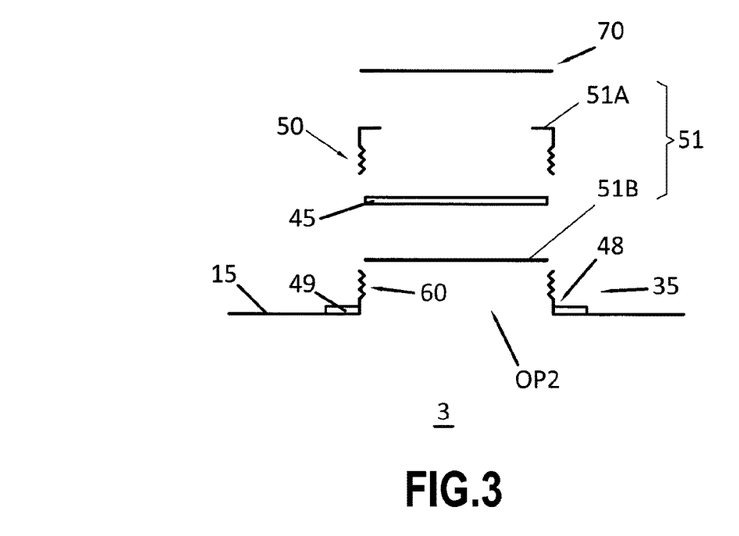
FIG. 3 illustrates a diagrammatic exploded view of an example of a throughput structure of a container.

The filter structure 50 may include a filter holder 47 to hold a filter 45. As shown in FIG. 3, the filter holder 47 for instance includes a filter support structure 51 that extends on both sides of the filter 45 to retain the filter 45. The filter structure 50 can be decoupled from the reservoir 3 (i.e., in a filing/pouring mode), to allow build material 11 to pass through the opening OP2, for filling or pouring of build material. The throughput structure 35 may include a connection part 48 secured to the reservoir 3 to connect and disconnect the filter structure 50. In a particular example, the connection part 48 is provided with a flange 49 and screw-threaded cylindrical portion to allow selective connection and disconnection of the filter holder 47.

In the pouring/filling mode, i.e., without the filter 45 (and, more generally, without the removable filter structure 50), build material 11 may exit the reservoir 3 through the opening OP2 to facilitate pouring the build material out of the reservoir 3, and build material 11 may enter the reservoir 203 to fill the reservoir 3. In the pouring/filing mode, air can still enter into the reservoir so that the function of venting may be achieved.

Accordingly, it is possible to fill or empty the reservoir 3 even if the outlet structure 13 is not accessible, for instance because it is connected to a collection system, such as an aspiration hose, suction unit or the like. A user may fill the reservoir 3 through the throughput structure 35 or pour build material 11 out of the reservoir 3 through the throughput structure 35 even when build material 11 stored in the container 1 is being sucked by a collection system through the outlet structure 13. The user may uncouple the removable filter structure 50 from the connection part 48 of the throughput structure 35 to allow filling or emptying the reservoir 3. Once filling or pouring is completed, the user may reconnect the removable filter structure 50 to the connection part 48 to retain the build material 11 within the reservoir 3. Filling or pouring may be performed without the need to disconnect and reconnect the outlet structure 13, thereby saving time and limiting manipulations of the outlet structure 13 and collection system by the user. The reservoir 3 may even be filled or emptied using the throughput structure 35 without interrupting collection of the build material 11 stored within the reservoir 3 from a collection system.

In a particular example depicted in FIG. 3, the connection part 48 of the throughput structure 35 includes a portion 60, in cylindrical in shape, which may be coupled to or uncoupled from the removable filter structure 50 described with reference to FIG. 2, for instance using a threading profile formed on the outer surface of the cylindrical portion 60. In one example, the cylindrical portion 60 is substantially rigid as compared to the relatively flexible top wall 15 to which it is attached. An annular flange portion 49 may extend around the cylindrical portion 60, for example as an integrally molded structure, to facilitate said attaching. The longitudinal axis of the cylindrical portion 60 is for instance perpendicular to the top wall 15 of the reservoir 3. Air and build material may enter through the cylindrical portion 60 and access directly the inside of the reservoir 3 as no further guide structure, channel, path wall or the like is present within the reservoir 3 to guide air and build material into the reservoir 3, thereby allowing passage of build material 11 in or and out of the reservoir 3.

As can be seen from the diagrammatic exploded view of FIG. 3, the filter structure 50 may be screwed to the cylindrical portion 60 by internal screw threads. In other examples, the filter structure 50 could friction fit to the cylindrical portion 60. Before attaching the filter structure 50 to the reservoir 3, the filter structure 50 may need to be assembled. For example, the filter 48 is placed in the filter structure 50 against a first filter support structure 51A of the filter support structure 51. The first filter support structure 51A may be an integral part of the (e.g., single mold) filter structure 50. Then, a second filter support structure 51B of the filter support structure 51 may be fitted, for example press fitted, into the filter structure 50 to retain the filter 48. In one example, the filter structure 50 includes internal ribs to hold the second filter support structure 51B. As can be seen in FIG. 3, the first filter support structure 51A can comprise a rib structure that extends across the throughput opening OP2. The first and second filter support structure 51A, 51B may be of similar shape and configuration, except that the second filter support structure 51B may be a separate component to be assembled to the filter structure 50 while the first filter support structure 51A may be integral to the filter structure 50 as part of a single mold structure.

In the examples of the present disclosure, air flow is used to transport the build material from the reservoir out of the container. In particular, as indicated earlier, the throughput structure 35 may allow air to enter into the reservoir 3. It should be understood that gas other than air may be used in the present disclosure. In a particular embodiment, the gas used to generate a gas flow within the reservoir to collect the build material includes at least one of air, nitrogen, helium and argon.

The filter 45 depicted in FIG. 2 may be made up of open cell, reticulated, Polyurethane foam. This filter 45 may be in the form of a layer, for instance approximately 3 to 6 mm thick. The specifications of the filter 45, including the porosity and/or the thickness thereof, should be adapted to the kind of build material 11 that is to be retained in the reservoir 3 so that proper filtering can be achieved. The filter 45 may have at least 60 PPI (i.e., "Pores Per Inch"), at least 80 PPI, at least 100 PPI, at least 120 PPI, at least 140 PPI, or at least 160 PPI. The average pore diameter may be at least 30 microns, at least 25 microns, at least 20 microns, at least 15 microns, at least 10 microns or at least 5 microns. The filter 45 may for instance have approximately 80 PPI and an average pore diameter approximately from 25 to 30 microns.

In a particular example, the filter holder 47 may include a housing which allows the air filter 45 to be removed for replacement. In a particular example, a new filter holder 47 including another air filter 45 is coupled to the throughput structure 35 when filter replacement is needed.

The throughput structure 35 may be sealed with at least one suitable seal structure to inhibit passage of air and build material through the throughput opening OP2 as long as said seal is in position on the throughput structure 35. In one example, the seal structure is a seal film that is adhered over the throughput opening OP2. The seal structure may be an induction-heat seal or an adhesive seal. In one example, a filled container 1 is sealed with the seal structure after it is filled with virgin build material in a filling station. In a particular example shown in FIG. 3, a top side of the filter support structure 51 is sealed with a seal structure 70 so as to prevent access of air and build material through the throughput structure 35. The seal structure may be a one-time seal to be removed before a first time usage of the container 1.

In a particular example, the outlet structure 13 may be sealed with at least one suitable seal structure, for example a seal film that is adhered over the outlet opening OP1. The seal structure of the outlet structure 13 may be of the same kind as described above with respect to the seal structure of the throughput structure 35. As indicated above, in a particular example, a filled container 1 is sealed with a one-time seal after it is filled with virgin build material in a filling station.

In addition, a separate cap or lid may be provided over each of the outlet structure 13 and throughput structure 35. These two caps are distinct from each other so that the outlet structure 13 and throughput structure 35 can be opened and closed independently. It is thus possible to access the outlet structure 13 without removing the cap of the throughput structure 35 (and conversely), thereby allowing for instance connection of the outlet structure 13 to a collection system while maintaining in position the cap covering the throughput structure 35. As a result, one may remove the cap of the throughput structure 35 only when collection of build material 11 from the reservoir 3 is needed or when venting of the inside of the reservoir 3 is needed. In another example, this may allow improving protection of the seal of the throughput structure 35.

Figure 4:
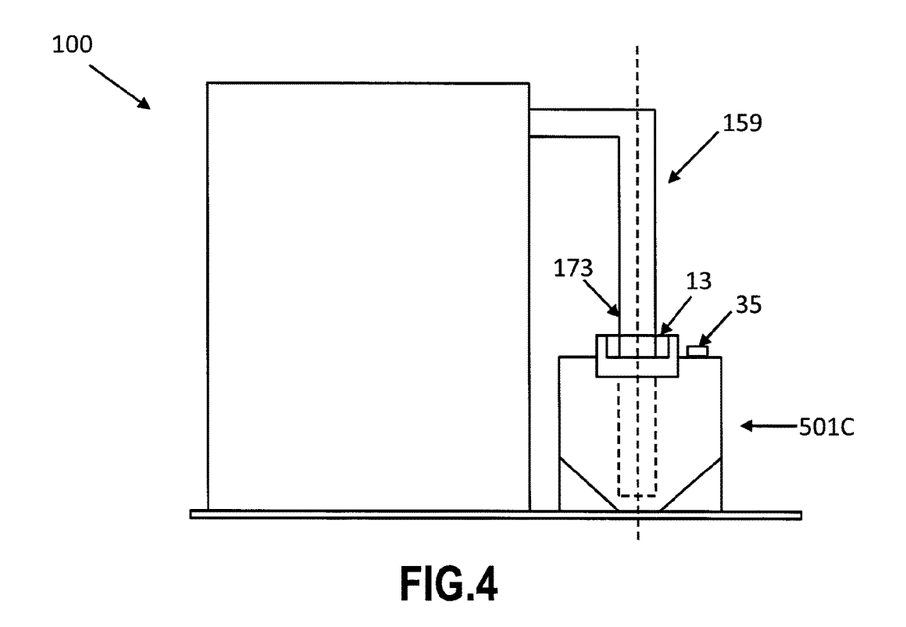
FIG. 4 illustrates a diagram of an example of an additive manufacturing apparatus.

FIG. 4 illustrates an additive manufacturing apparatus 100 including a build material container 1 of this disclosure. The additive manufacturing apparatus 100 includes a pressure unit 159 to suck build material from the container 1 through a vacuum tube snout 173. The pressure unit 159 includes a vacuum pump. The pressure unit 159 and container 1 may include interconnecting adaptors to facilitate interconnection of the outlet structure 13 and snout 173, and inhibit powder leakage before, during and after vacuum suction. The additive manufacturing apparatus 100 may further include at least one of a build material recycling system and a fusing agent dispenser. The additive manufacturing apparatus 100 may further include a build material return system to (re)fill the container 1, for example for buffering or recycling the build material. To that end, the pressure unit 159 may include a bi-directional air pump, to facilitate both build material retrieval from, and build material filling of, the reservoir 1.

The container 1 may be adapted for multiple purposes including transport, host apparatus interconnection, build material collection, collapsing into a flat stackable structure, easy disposal, single fill usage, multiple fills usage, recycling, storing, lifting by an operator, etc. The container 1 facilitates relatively easy interconnection with the host apparatus while inhibiting build material (e.g. powder) leakage from the apparatus 100. In one example, the container 1 inhibits that build material powder dust escapes to the environment, during the container life cycle, i.e. during filled transport, apparatus interconnection, retrieval, until exhaustion.

Figure 5:
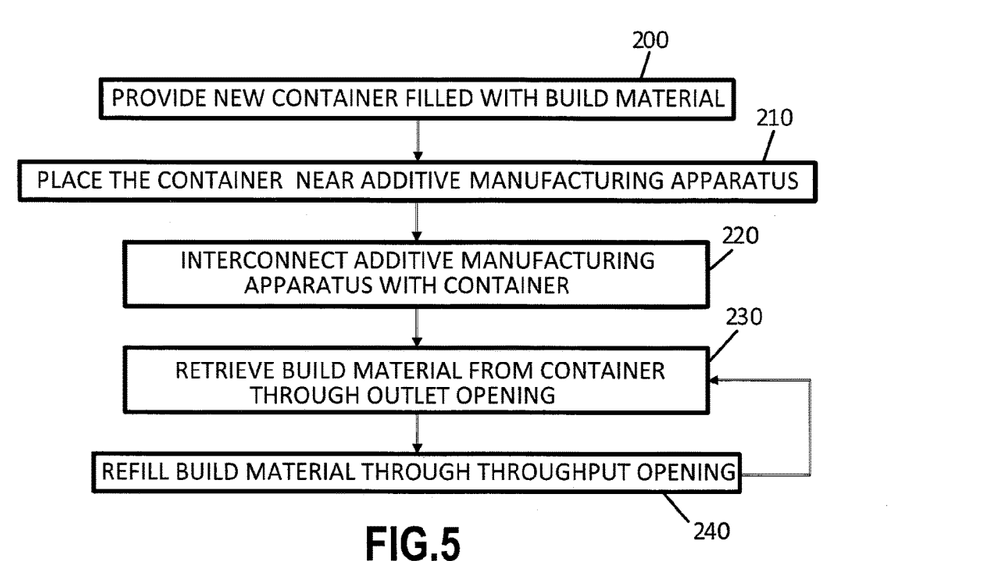
FIG. 5 illustrates a flow chart of an example of a method of using a build material container.

FIG. 5 illustrates an example of a method of using a build material container of this disclosure in conjunction with an additive manufacturing apparatus. The method may include providing a new container 1, as depicted with reference to FIGS. 1 and 7, filled with build material (block 200). The method may include placing the container 1 near an additive manufacturing apparatus, such as the additive manufacturing system 100 depicted in FIG. 4 (block 210). The method includes interconnecting the additive manufacturing apparatus 100 with the container 1 (block 220). The method includes having the additive manufacturing apparatus 100 retrieve the build material from the container 1 through the outlet opening OP1 (block 230). During such retrieving, air may vent into the container 1 through the throughput opening OP2. The method may further include having the additive manufacturing apparatus 100 refill the container through the throughput opening OP2 (block 240). In a particular example, the removable filter structure 50 depicted in FIG. 3 is uncoupled from the reservoir 3 to allow refill through the throughput opening OP2. In one example the container 1 is refilled during additive manufacturing, whereby the container can be used as a buffer.

Figure 6:
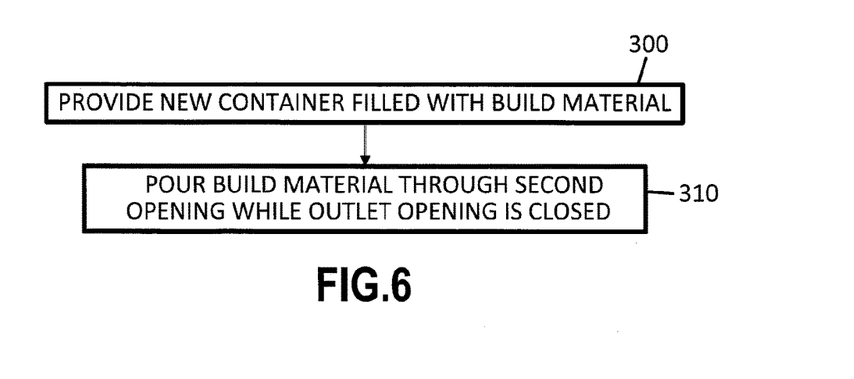
FIG. 6 illustrates a flow chart of another example of a method of using a build material container.

FIG. 6 illustrates an example of a method of using a build material container of this disclosure, such as the container 1 depicted in FIG. 1 in the present case. The method includes pouring the build material from the container 1 through the throughput opening OP2 while the outlet structure 13 is maintained closed (block 310). In one example, a lid closes off the outlet opening OP1 during said pouring. In a further example, the build material is poured into a build material transport mechanism for delivering the build material onto a build material stage.

In one example the reservoir is at least partly flexible. Portions of the flexible walls of the reservoir may flex and/or vibrate when positive or negative pressure is applied, thereby assisting in flow of the build material towards the collection area. In certain scenarios some of the build material may release itself from certain pockets or corners formed in the flexible walls by vibration or flexing of the walls. Thereby most or all of the build material can be retrieved from the reservoir.

In a particular example, the build material container may comprise a plurality of throughput structures as described above. Arranging plural throughput structures, for instance each on the top side of the reservoir, may allow improving venting and/or filling and pouring of the container.

In a particular example, the build material container may comprise one or a plurality of vent structures, for instance each on the top side of the reservoir, distinct from the throughput structure so that a more uniform air flow within the reservoir can be achieved.

Referring again to FIG. 7, in an example, a second vent structure 61, that is distinct from the throughput structure 35 and arranged at a distance thereof, may be provided to communicate with the inside of the reservoir 3. In a particular example, as shown in FIG. 7, the second vent structure 61 may be arranged to vent a build material collection area near the bottom 9. Other positions of the second vent structure 61 are possible in the present disclosure. In different examples, the second vent structure 61 can be provided in a converging bottom wall 21 and/or within the tubular collection unit 17. Where the second vent structure 61 is provided through at least one of the converging walls 21, it may include a filter to retain build material. Where the second vent structure 61 extends along the tubular collection unit 17, it may be a parallel channel along the tubular collection unit 17, and/or a concentric channel in the tubular collection unit 17.

Providing the build material container with the second vent structure 61 in addition to the throughput structure 35 further facilitates air flow within the container, for instance in a case where there is build material located between the throughput structure and the second vent structure, thereby preventing that build material bridges or pockets in the reservoir affect air flow. Arranging the throughput structure 35 and the second vent structure 61 at opposite side of the reservoir (for instance one on the top wall 15 and the other on a converging bottom wall 21) also allows build material to be collected both (1) by vacuum through the outlet structure 13 when the container is in an upright configuration and (2) by pouring through the throughput structure 35 when the container is in an inclined configuration.

In certain examples, a lower portion of the reservoir does not need to have a funneled shape. For example, the side walls of the reservoir may be upright from top to bottom. For example the side walls may be substantially rectangular. Such container may efficiently store build material within the contours of the container, for example more efficiently than a container with a partly funneled reservoir. A disadvantage can be that it may be more difficult, as compared to funneled reservoirs, to extract all or most of the build material from the bottom. Certain measures may be provided to counter such potential disadvantage, for example the vacuum tube in the container can be made flexible, or adapted in such a manner, to be able to reach build material near edges of a bottom of the reservoir. In another example, the bottom can be made flexible to vibrate or flex under vacuum pressure, in such a manner that the build material drops or moves toward a bottom collection area, for example as illustrated in FIGS. 1 and 7. Again referring to FIGS. 1 and 7, a longitudinal outlet tube 11 may engage the bottom at the center whereby the bottom around the center may lift under vacuum pressure and the outlet tube 11 retains the center bottom, and whereby the build material may move towards the inlet of the suction openings of the outlet tube.

In one example, the container is suitable for transport, additive manufacturing apparatus interconnection, build material retrieval, replacement, and disposal. In one example, for disposal purposes, the reinforcement structure includes cardboard or other bio-degradable material. Other bio-degradable material can include other cellulose fiber based material. The flexible reservoir can be made of a relatively degradable plastics, such as certain polyethylene films. In another example the flexible reservoir can include at least one bio-degradable layer such as coated, compressed cellulose based materials. Special coatings may provide for an air/vapor barrier.

In one example a pressure unit of an additive manufacturing apparatus, to be connected to a container of this disclosure, has an air speed of at least 10 liters per seconds or at least 15 liters per second, for example 20 to 30 liters per second. In one example, the flexible reservoir wall material is to flex or vibrate when air circulates into the container though the throughput opening and out of the container through the outlet opening, The containers of this disclosure may be arranged to provide build material to additive manufacturing apparatuses for additive manufacturing. In certain examples the additive manufacturing apparatus is directly connectable to the container to collect the powder from the container and add it to the additive manufacturing process. The additive manufacturing apparatus can be a recycler and/or a 3D printer that includes a pressure unit. In another example, separate, specialized build material pressure unit can be used to transport build material from the container to the additive manufacturing apparatus.

In one example the container is a source supply of virgin build material. In another example the container is a source supply of recycled or partly recycled build material. In yet another example the container may be used, at least temporarily, as a buffer supply.

What is claimed is:
1. A build material container including:
   a reservoir to hold build material wherein the build material is powder for 3D printing;
   a first outlet structure to allow the build material to enter or exit the reservoir through said outlet structure; and
   a second outlet structure, distinct from said first outlet structure, including an opening to allow gas to enter into the reservoir through said opening,
   wherein the second outlet structure includes a removable filter structure to inhibit access to the build material in and out of said reservoir while allowing the gas to enter into said reservoir, when said removable filter structure is coupled with the opening of the second outlet structure, and
   wherein the removable filter structure includes a support structure and a filter held by the support structure, the removable filter structure allowing venting of the gas inside of the reservoir, said removable filter structure being selectively coupled to and uncoupled from the reservoir such that:

the second outlet structure allows the build material to be poured out of the reservoir when the removable filter structure is uncoupled from the reservoir; and the second outlet structure retains the build material in the reservoir while allowing the gas to enter and exit said reservoir when the removable filter structure is coupled to the reservoir.

2. The build material container of claim 1, wherein the powder has an average volume-based particle diameter of less than 120 microns.

3. The build material container of claim 1, wherein the removable filter structure includes an open-cell foam layer having a porosity at least 60 approximately PPI.

4. The build material container of claim 1, wherein the reservoir is made of partly flexible material.

5. The build material container of claim 1, wherein the gas includes at least one of air, nitrogen, helium and argon.

6. The build material container of claim 1, wherein the second outlet structure is positioned at a top portion of the reservoir.

7. The build material container of claim 6, wherein the first outlet structure is positioned at the top portion of the reservoir, the second outlet structure being positioned between the first outlet structure and a lateral side wall of the build material container.

8. The build material container of claim 1, including a removable seal to inhibit passage of gas and the build material through the opening of the second outlet structure as long as said seal is in position on said second outlet structure.

9. The build material container of claim 8, wherein the removable seal is an induction-heat seal or an adhesive seal.

10. The build material container of claim 1, wherein the first outlet structure and the second outlet structure include respectively a first cap and a second cap distinct from each other to selectively open and close the first outlet structure and second outlet structure.

11. The build material container of claim 1, wherein the opening of the second outlet structure is circular in shape and has a diameter between 50 and 65 mm.

12. The build material container of claim 1, further including a vent structure distinct from the second outlet structure.

13. The build material container of claim 12 wherein said vent structure is positioned near a bottom build material collection area in the reservoir.

14. The build material container of claim 1, wherein the first outlet structure includes a guide feature to guide an aspiration structure into connection for aspiration.

15. The build material container of claim 1, wherein the first outlet structure includes a build material outlet opening at a top portion of the reservoir.

16. The build material container of claim 15, wherein the first outlet structure includes a collection unit to collect the build material from the bottom of the reservoir and guide the build material to the build material outlet opening.

17. The build material container of claim 16, wherein the collection unit includes a tube extending in the reservoir from a top region to a bottom region of the reservoir.

18. The build material container of claim 16, wherein a vent structure is included in, or connected to, the collection unit.

* * * * *